United States Patent [19]

Ervin

[11] 4,168,489

[45] Sep. 18, 1979

[54] FULL PAGE MODE SYSTEM FOR CERTAIN WORD PROCESSING DEVICES

[75] Inventor: Jerry L. Ervin, Playa del Rey, Calif.

[73] Assignee: Lexitron Corp., Chatsworth, Calif.

[21] Appl. No.: 877,015

[22] Filed: Feb. 13, 1978

[51] Int. Cl.[2] .......... G06K 9/00

[52] U.S. Cl. .......... 340/146.3 AH; 340/146.3 MA; 340/731; 340/812

[58] Field of Search .......... 340/146.3 MA, 146.3 H, 340/146.3 AH, 324 M, 324 A, 324 AD

[56] References Cited

U.S. PATENT DOCUMENTS

| | | | |
|---|---|---|---|
| 3,289,164 | 11/1966 | Rabinow | 340/146.3 H |
| 3,991,868 | 11/1976 | Robinson et al. | 340/324 AD |
| 4,069,511 | 1/1978 | Lelke | 340/324 AD |
| 4,087,808 | 5/1978 | Herndon | 340/324 AD |
| 4,090,188 | 5/1978 | Suga | 340/324 AD |
| 4,097,846 | 6/1978 | Lewis | 340/146.3 MA |

*Primary Examiner*—Leo H. Boudreau
*Attorney, Agent, or Firm*—Martin R. Horn

[57] ABSTRACT

An electronic system for reducing a full page of text to fit onto the visual display screen of a partial page display word processing device for purposes of reviewing the format and page layout of the text. The text is not always legible in this condensed mode, which is switch selectable by the operator, but while in this mode the text may be edited and manipulated in the normal manner provided by the controls of the word processing device. The system utilizes both electronic digital logic and analog circuits to condense the size of an entire page of text by approximately a factor of three. The digital logic selects and displays only five of the normal fourteen horizontal lines of dots comprising each row of characters within the page of text to be reduced, thus condensing the characters vertically. The analog circuit causes less current to flow through the horizontal winding of the deflection yoke of the cathode ray tube which constitutes the visual display screen without otherwise affecting the display circuit. This causes less deflection of the beam, thus condensing the page of text horizontally.

6 Claims, 7 Drawing Figures

LN00
LN08
LN12
45
46
47
22
43
BCD TO DECIMAL DECODER
41
40
LOAD *
23
44
L3
L2
L1
L0
35
36
37
38
+5V
1K
BINARY SYNCHRONOUS COUNTER
FPM
30
LCAR
31
25
26
27
28
21
LI3
LI2
LI1
LI0
EOL
32
42
33

Fig. 4a $$L0_{t_1} = L3_{t_0} \cdot \overline{L2}_{t_0}$$

$$L1_{t_1} = L3_{t_0} \cdot L2_{t_0} + (LN00)_{t_0} + (LN08)_{t_0}$$

$$L2_{t_1} = \overline{L2}_{t_0} \cdot L1_{t_0}$$

$$L3_{t_1} = L3_{t_0} \cdot \overline{L2}_{t_0} + (LN12)_{t_0}$$

Fig. 4b

NORMAL

| L3 | L2 | L1 | L0 | | |
|---|---|---|---|---|---|
| 1 | 0 | 0 | 0 | ← TOP ROW OF DOTS | LIN 00 |
| 1 | 0 | 0 | 1 | | LIN 01 |
| 1 | 0 | 1 | 0 | | LIN 02 |
| 1 | 0 | 1 | 1 | | LIN 03 |
| 1 | 1 | 0 | 0 | | LIN 04 |
| 1 | 1 | 0 | 1 | | LIN 05 |
| 1 | 1 | 1 | 0 | | LIN 06 |
| 1 | 1 | 1 | 1 | | LIN 07 |
| 0 | 0 | 1 | 0 | ← LOAD* | LIN 08 |
| 0 | 0 | 1 | 1 | | LIN 09 |
| 0 | 1 | 0 | 0 | | LIN 10 |
| 0 | 1 | 0 | 1 | | LIN 11 |
| 0 | 1 | 1 | 0 | | LIN 12 |
| 0 | 1 | 1 | 1 | ← BOTTOM ROW OF DOTS | LIN 13 |

FULL PAGE MODE

| L3 | L2 | L1 | L0 |
|---|---|---|---|
| 1 | 0 | 0 | 0 |
| 1 | 0 | 1 | 1 |
| 1 | 1 | 0 | 1 |
| 0 | 0 | 1 | 0 |
| 0 | 1 | 1 | 0 |

HORIZONTAL SWEEP CIRUIT WITH SWITCHABLE INDUCTOR ELEMENTS

FULL PAGE MODE SYSTEM FOR CERTAIN WORD PROCESSING DEVICES

BACKGROUND OF THE INVENTION

1. Field of the Invention

This invention relates to electronic text display and processing systems which in their normal mode display only a partial page of text. More particularly this invention is a device for reducing in size a full page of text so as to fit onto the visual display screen of a partial-page display word processing device without impairing the word processing functions of the device.

2. Description of the Prior Art

Prior art electronic word processing and text display systems utilizing a visual display screen, such as those exemplified by U.S. Pat. No. 3,810,107, generally have rather large displays of the cathode ray tube type and are capable of displaying a full page (8½ inches by 11 inches) of text at one time. The display of an entire page of text allows an operator to visually check and correct the format and layout of the page as a whole, thus simplifying the task of preparing aesthetically pleasing documents.

Smaller less expensive word processing systems have been developed since the introduction of the original large display screen devices. The component most reduced in size in the smaller word processing systems is the display screen, which is commonly reduced to 10 inches wide by 5 inches high. These systems display only a portion of a page of text at one time. A major problem of a small display screen system is that checking and correcting the format of the full page of text is difficult when only a portion of the page, such as one-third, is viewable at any one time.

Several potential solutions exist to the problem of reducing a page of text to fit within the confines of the display screen of a partial-page word processing system. The major difficulty encountered in such a reduction is in shrinking the horizontal dimension of the page so that the aspect ratio of the page remains constant. One solution would be to increase the output rate of the characters in the text, resulting in the same amount of information being displayed in a shorter length. However, this solution would require faster and more costly electronic logic circuits and a digital video system having a wider than normal information bandwidth.

Other possible horizontal reductions involve the horizontal sweep circuit of the cathode ray tube display assembly. As a general rule reducing the current through the horizontal winding of the deflection yoke compresses the horizontal image produced on the cathode ray tube screen. However, unless the method used to limit the current is carefully designed, adverse side-effects may occur affecting other functions of the horizontal sweep circuit, such as the beam retrace period. Another adverse side effect would be serious overstressing of other circuit components.

One prior art device employing switchable changes in the level of current to the deflection circuits of the cathode ray tube is a consumer-oriented television set with a "zoom" feature that enlarges the picture. Increases in the current to both the horizontal and vertical deflection circuits are made, thus expanding the transmitted picture. However, this technique is not practical for image size reduction in high resolution character displays as used in word processing machines.

Prior art systems that allow for reductions in image sizes, such as those exemplified by U.S. Pat. No. 3,976,982, by means of logical area-averaging techniques, are unsuitable for horizontal compression in a word processing device due to a loss in resolution of the characters comprising the text.

An object of the present invention is therefore to provide a means for achieving both vertical and horizontal compression of digital display data which does not require costly exotic circuitry, cause adverse side effects on other circuit components, and which is easily implemented on an existing display machine and readily selectable by the machine operator.

Other objects and advantages of the present invention will become apparent as the device is described below.

SUMMARY OF THE INVENTION

In order to overcome the shortcomings of small display screen word processing systems noted above, the present invention allows an operator, at the touch of a button, to reduce the size of an entire page of text so as to fit on the small display screen. While the word processing system is in this Full Page Mode, the text is not always legible, but the format and page layout is clear and can be manipulated by controls of the system. For example, while in the Full Page Mode paragraphs can be moved and lines and characters can be inserted or deleted in order to properly orient the text on the page. Normal typing can also be done while the system is in the Full Page Mode, but lengthy additions are best done in the Normal Mode of the system since the text in the latter mode is more legible.

The reduction in page size effected by the present invention is accomplished by a combination of electronic digital logic and analog circuits.

Each character in a page of text is formed on the visual display screen of the word processing system by a pattern of light and dark dots within a matrix that measures 8 dots horizontally by 14 dots vertically. To keep the same aspect ratio found in the Normal Mode, both the height and width of each character must be reduced by the same multiplicative factor when the Full Page Mode is activated by the operator. Preserving the same aspect ratio in the Full Page Mode as is used in the Normal Mode improves the legibility of the displayed characters and also better approximates the appearances of a page of text. The present invention reduces a page to approximately one-third its normal size. Since the word processing system in its Normal Mode can display about one-third of a page, the Full Page Mode allows a full page of text to fit on the visual display screen.

The present invention accomplishes a reduction in the height of each character by utilizing electronic digital logic to select only 5 of the 14 rows of vertical dots comprising each character matrix and transmitting this vertically reduced form of the character to the video display circuitry. Thus, each character is vertically reduced by approximately a factor of 3. Since all of the lines of text have been reduced to approximately one-third of their former height, a full page may now be displayed at one time on the visual display screen. However, some legibility is lost when this reduction is made.

The horizontal reduction of each character is accomplished by means of an analog circuit that, when the Full Page Mode is selected, causes a decrease in the current flowing through the horizontal winding of the cathode ray tube deflection yoke. Lessened current through the horizontal winding compresses the image width on the visual display screen. The analog portion of the Full Page Mde circuit does not otherwise affect the overall electrical characteristics of the horizontal sweep circuit of the cathode ray tube.

The decrease in the current in the horizontal winding of the cathode ray tube deflection yoke, without otherwise affecting the overall electrical characteristics of the horizontal sweep circuit, is accomplished by switching an inductor into series connection with the horizontal winding, while shunting current around the horizontal winding through a second inductor such that the total inductance of the horizontal winding circuit remains constant. Switching between the Normal Mode and the Full Page Mode is achieved by means of a relay activated by the digital logic portion of the Full Page Mode. Additional circuits in the analog portion have been added to provide arc protection for the relay contacts, and also to provide damping for the large valued series inductor activated in the Full Page Mode.

BRIEF DESCRIPTION OF THE DRAWINGS

FIG. 4*a* sets forth the logic state equations effectuated by the logic circuit set forth in FIG. 3;

FIG. 4*b* depicts the counting sequences of the Normal Mode and the FULL PAGE MODE;

DESCRIPTION OF THE PREFERRED EMBODIMENT

1. Vertical Character Reduction Circuit

Figure 1:
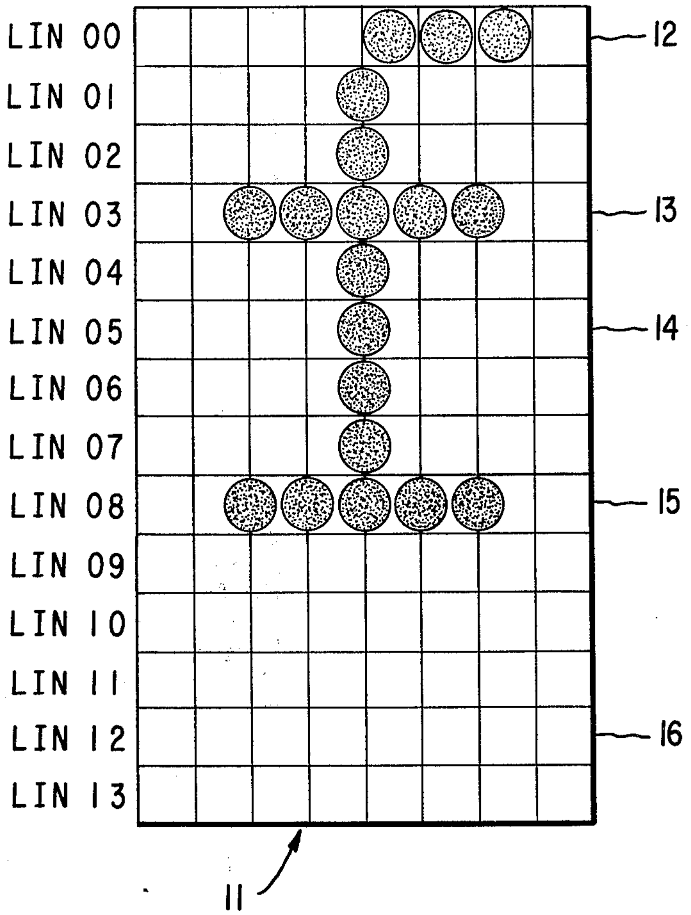
FIG. 1 sets forth a pictorial illustration of a typical character in the Normal Mode.

Referring to FIG. 1, there is illustrated the manner in which a character is made from elements of a matrix which corresponds to a dot pattern generated on the word processing system's cathode ray tube (CRT) display screen. The character matrix 11 measures 8 dots horizontally by 14 dots vertically. By means of the electronic logic circuit set forth in FIG. 3, a character matrix 11 can be vertically compressed to the general form shown in FIG. 2 by selecting out only five of the fourteen rows of the character matrix. The rows selected are the lines LIN 00, LIN 03, LIN 05, LIN 08, and LIN 12 denoted by the reference characters 12, 13, 14, 15 and 16 respectively. These five particular rows were chosen as best preserving the legibility of the multitude of characters capable of being formed by a character matrix.

Figure 2:
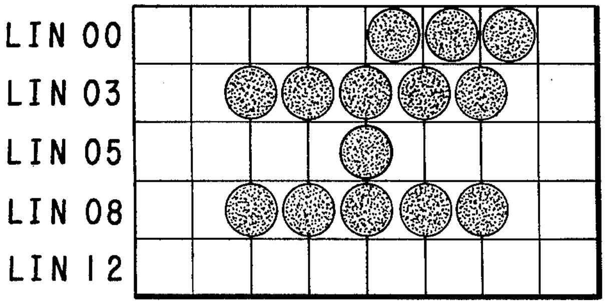
FIG. 2 illustrates an example of a vertically compressed character.
Figure 3:
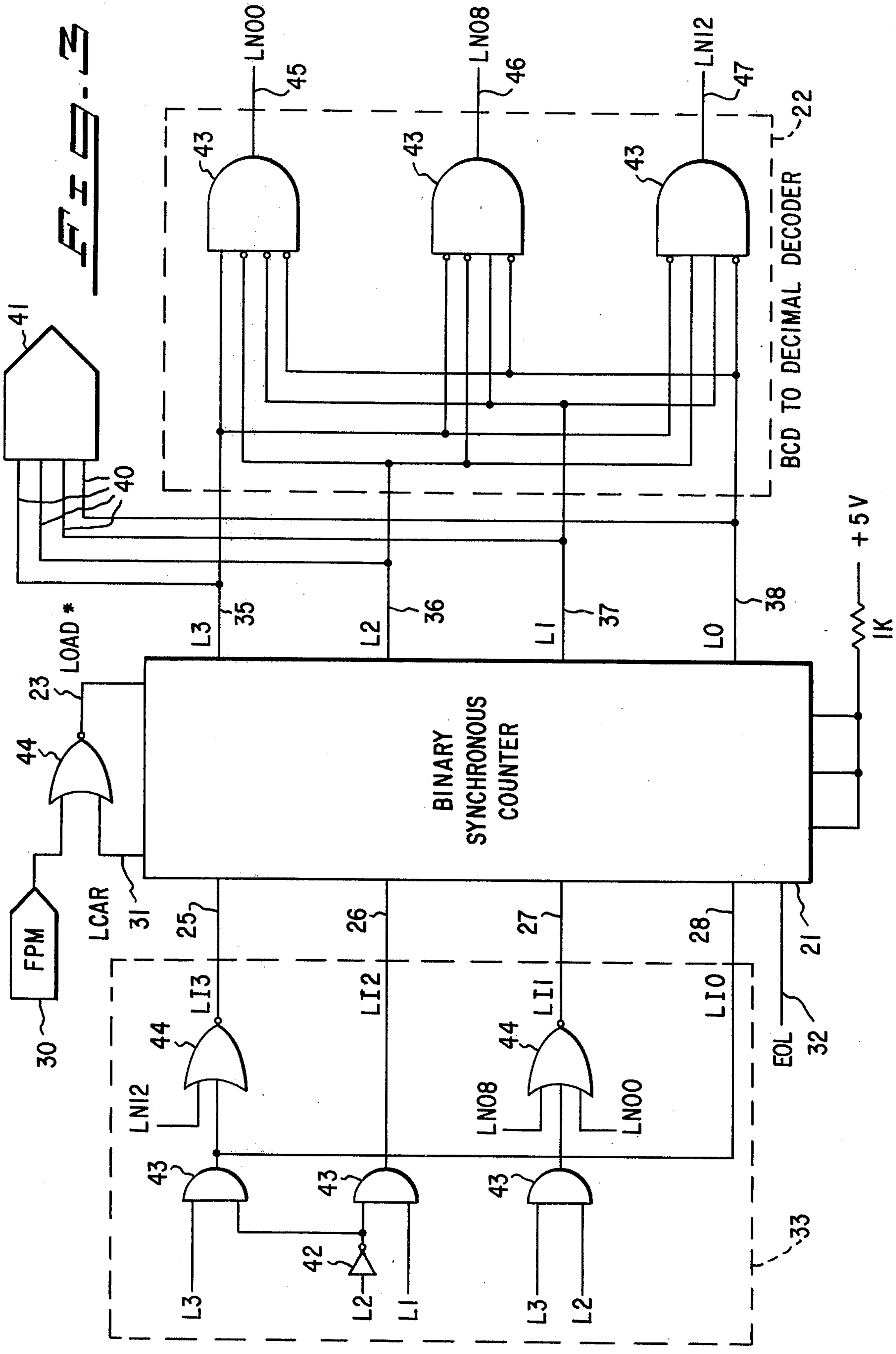
FIG. 3 shows the detailed digital logic portion of the preferred embodiment.

FIG. 2 illustrates the results of applying the FULL PAGE MODE logic circuit shown in FIG. 3 to a typical character generated by the word processing system. The general form of the character is recognizable, but full legibility is lost.

Referring now to FIG. 3, there is depicted the digital logic circuit that effectuates the vertical reduction in character size which is an object of the present invention. The logic circuit shown is essentially a dual-mode programmable counter with feedback inputs. That is, the synchronous counter 21 can be caused to count in two modes by utilization of the counter outputs 35, 36, 37, and 38 as inputs to the logic network 33. In the NORMAL MODE of operation, the inputs 25, 26, 27 and 28 are disabled from the inputs to the synchronous counter. The synchronous counter 21 counts in sequential order from binary 2 through binary 15, beginning at binary 8 (or 1000) to indicate the first row of the matrix (which has been labled LIN 00) in response to the stepping signal EOL 32. When binary 15 is reached in this count, a positive logic carry-out signal 31, designated LCAR, is generated by the synchronous counter 21 and NOR-gated to the negative-logic input terminal LOAD* 23. (An asterisk following a signal name indicates the logical inverse of the signal). The LCAR signal 31, applied to the LOAD* 23 input terminal, gates the input signals LI3, LI2, LI1, and LI0 (25, 26, 27 and 28 respectively) into the input terminals of the synchronous counter 21, causing the associated output signals L3, L2, L1, and L0 (35, 36, 37 and 38 respectively) to correspond identically to the inputs when the LCAR signal 31 returns to logical zero. At the time the LCAR signal 31 is generated, the binary value of the (disabled) input signals to the synchronous counter 21 is "0010", with LI3 corresponding to the highest order bit. This bit pattern is the result of the operation of the logic-network 33 on the outputs (35, 36, 37 and 38) of the synchronous counter 21 in accordance with the logic state equations set forth in FIG. 4*a*. The result of the operation performed by the logic network 33, in conjunction with the generation of the LCAR signal 31, is to force the synchronous counter 21 to count from binary 2 through binary 15 (omitting binary 0 and 1) as shown in FIG. 4*b*. Referring now to FIG. 3, the outputs of the synchronous counter 21, counting from binary 2 through binary 15, are inputs 40 to the conventional character generation circuit 41 of the word processing system. For each particular count, the word processing system displays a row of dots from each character in a line of text. Upon reaching the end of the line, the EOL signal 32 is generated by the word processing system and is utilized to advance the count of the synchronous counter 21. Thus the next row of character dots is selected and displayed in typical raster-scan manner.

When the FULL PAGE MODE is switch-selected by the operator, the FPM signal 30 goes to a logical "1", thereby constantly activating the LOAD* 23 input to the synchronous counter 21, to the effect that the inputs (25, 26, 27 and 28) to the counter are periodically transferred to the outputs (35, 36, 37 and 38, respectively) during the clock cycle determined by signal EOL 32. The values of inputs to the counter are determined by the logic network 33 that effectuates the logic equations set forth in FIG. 4*a*. The normal counting cycle from binary 2 through binary 15 is thus interrupted by the application of the FPM signal 30 and an artificial cycle of five counts is generated by logic network 33, corresponding to the five character rows to be selected from the character matrix of FIG. 1.

It is to be observed that the logic equations given in FIG. 4*a* are implemented by the logic network 33 shown in FIG. 3 utilizing inputs LN12, LN08 and LN00 (47, 46 and 45, respectively). The generation of these signals is shown in the decoder circuit 22 also illustrated in FIG. 3. The signals LN00, LN08 and LN12 are each logical signals. Signal LN00 45 is a logical 1 whenever the output of the binary synchronous counter is "1000" (i.e. L3=1, L2=0, L1=0 and L0=0). Signal LN08 46 is a logical 1 whenever the output of the binary synchronous counter is "0010". Signal LN12 is a logical 1 whenever the output of the binary synchronous counter is "0110". The signals LN00 (45) LN08 (46) and LN12 (47) are then used as inputs to logic network 33 which then implements the five element binary counting mode illustrated in the right half of FIG. 4a.

The binary synchronous counter 21 outputs will thus cycle as follows:

"1000" causing the character generation circuit 41 to select and display the top row of the matrix dot elements of the line of text (LIN 00).

"1011" causing the character generation circuit to select and display the fourth matrix row for that line of text (LIN 03).

"1101" causing the display of the sixth matrix row for that line of text (LIN 05);

"0010" causing display of LIN 08.

"0110" causing display of LIN 12.

The FMP signal 30 shown in FIG. 3 is synchronized by the conventional character generation circuit 41 of the word processing system so that the synchronous counter 21 is not forced into an anomalous logic state by the logic network 33 when the FULL PAGE MODE switch is activated.

The effect of the FULL PAGE MODE short counting cycle is to cause the conventional character generation circuit of the word processing system to select and display only five raster-scan rows from each line of text, rather than fourteen, thus reducing the character size vertically.

2. Horizontal Character Reduction Circuit

Figure 5:
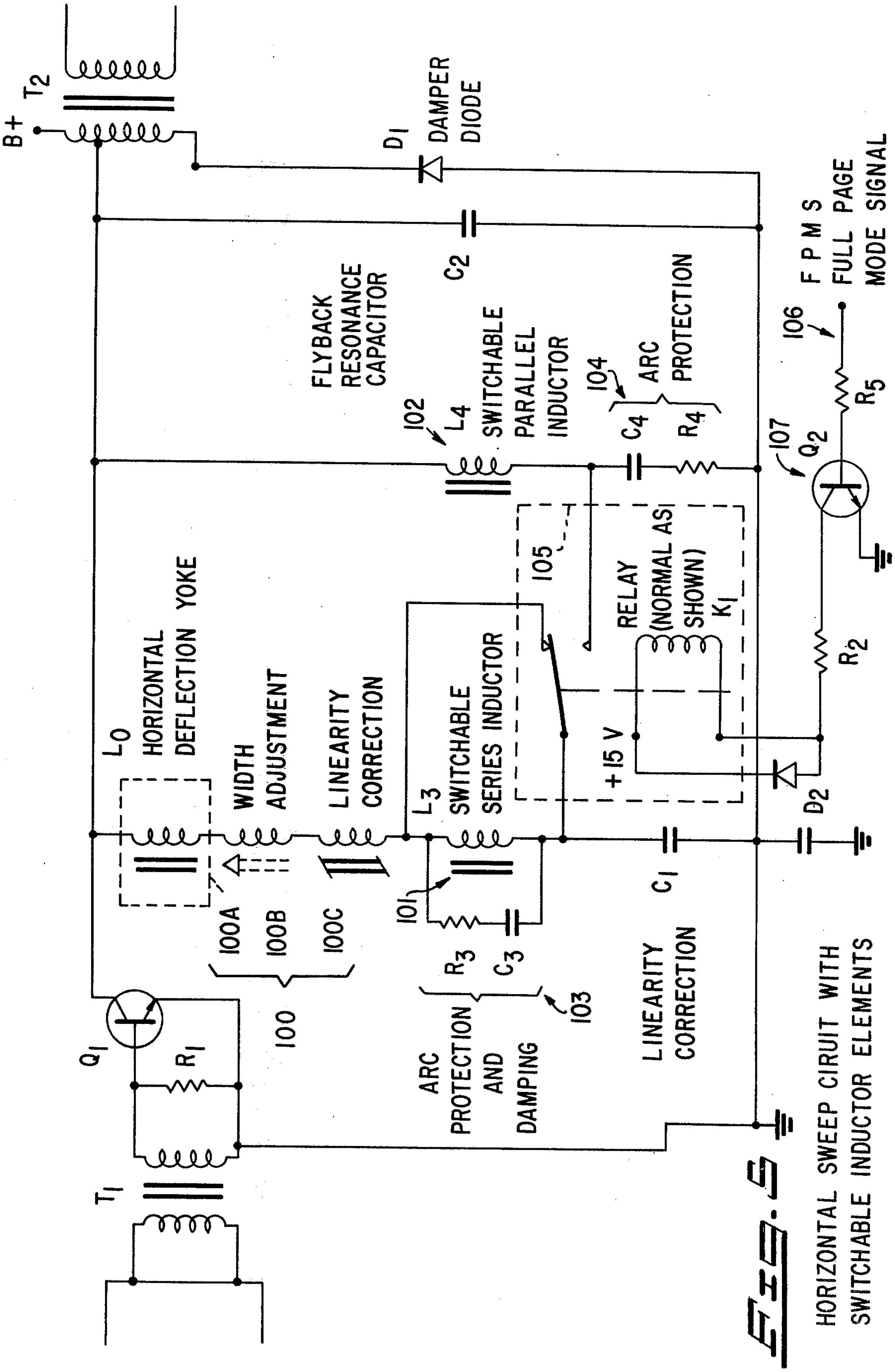
FIG. 5 shows the detailed analog portion of the preferred embodiment.

Referring now to FIG. 5, there is depicted a general schematic diagram of the conventional horizontal sweep circuit of a CRT together with the specific improvements made by the present invention. To effectuate a reduction in the horizontal size of the displayed characters when in FULL PAGE MODE, the entire CRT video display width is reduced by approximately a factor of 3. To accomplish this goal, the current flowing through the horizontal deflection yoke circuit 100, including the yoke 100A, the width adjustment coil 100B and the linearity correction coil 100C is reduced.

In the NORMAL MODE, current flowing through the yoke circuit 100 bypasses the switchable series inductor 101 by means of the short-circuit path created by the relay 105. Switchable parallel inductor 102 does not affect the current through the yoke circuit 100 while in this mode. Thus, the overall horizontal sweep curcuit operates in a conventional manner, deflecting the CRT beam the full width of the display screen.

In the FULL PAGE MODE, signal FPMS 106 (derived from the word processing system's logic circuits and the operator-activated FULL PAGE MODE keyboard switch) switches transistor Q2 107, which in turn causes the double-pole relay 105 to change state. When the relay 105 is in the FULL PAGE MODE state, the switchable series inductor 101 reduces the current through the yoke circuit 100, thereby causing a horizontal size reduction of the video picture. Switchable parallel inductor 102 also affects the overall electrical characteristics of the horizontal sweep circuit such that the total inductance of that portion of the circuit containing the yoke circuit 100, the switchable series inductor 101, and the switchable parallel inductor 102 remains the same as the yoke circuit 100 inductance when the circuit is in the NORMAL MODE, thus leaving the CRT beam retrace period constant.

Two additional modifications to the conventional horizontal sweep circuit have been made by this invention. First, in parallel with the switchable series inductor 101 is an arc protection and damping circuit 103 that provides protection for the relay 105 contacts and further provides electrical damping for the large-valued switchable series inductor 101. Second, in series with the switchable parallel inductor 102 is an arc protection circuit 104 which provides protection for the relay 105 contacts.

Figure 6:
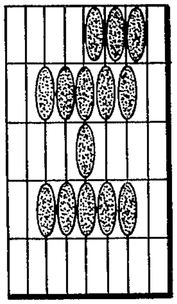
FIG. 6 depicts an example of a vertically and horizontally compressed character in the FULL PAGE MODE.

FIG. 6 illustrates the effect of the logic circuit of FIG. 3 and the analog circuit of FIG. 5 upon a typical character (shown in NORMAL MODE in FIG. 1). Both vertical and horizontal size reduction is accomplished. Further, since the FULL PAGE MODE reduction in character size is effectuated by manipulation of the word processing system's display circuits only, normal processing of the displayed text may be continued by the operator.

The foregoing has described a particular implementation of the novel concepts of this invention. It will be apparent that other equivalent implementations and variations may be effected without departing from the scope of this invention.

What is claimed is:

1. In an electronic word processing system wherein matrix characters are displayed on a video device such as a cathode ray tube, the improvement comprising:

an electronic digital counter means for selecting for display only certain of the horizontal rows of the matrix character so as to vertically reduce the size of the character;

an electronic circuit means for reducing the current through the cathode ray tube horizontal deflection winding so as to maintain proper vertical and horizontal aspect ratio without otherwise affecting the cathode ray tube horizontal sweep circuit operating characteristics; and, a control means for activating the current reduction means.

2. The improvement according to claim 1 wherein the means for reducing the current comprises:

a first inductor which is switched into series connection with the horizontal sweep circuit;

a second inductor which is switched into parallel connection with the series connection of the first inductor and the horizontal sweep circuit such that the total inductance of the horizontal sweep circuit remains constant;

means for minimize the effects of reducing the current upon the horizontal sweep circuit; and means to switch said first inductor, said second inductor and said minimizing means into and out of a first and second operating mode.

3. The improvement according to claim 2 wherein the means to minimize comprises a series connected resistor and capacitor connected in parallel with said first inductor.

4. The improvement according to claim 2 wherein the means to switch comprises a double-pole relay.

5. The improvement according to claim 3 further including means to protect said switching means from electrical arcing, comprising said minimizing means and a series connected resistor and capacitor connected in series with said second inductor.

6. The improvement according to claim 2 wherein said control means comprises an electrically activated switch.

* * * * *